Patented Oct. 20, 1925.

1,558,008

UNITED STATES PATENT OFFICE.

SAMUEL FREEDMAN, OF PHILADELPHIA, PENNSYLVANIA.

SEALING LIQUID FOR COMPRESSED-AIR CONTAINERS AND METHOD OF MAKING THE SAME.

No Drawing.   Application filed June 24, 1924.   Serial No. 722,075.

*To all whom it may concern:*

Be it known that I, SAMUEL FREEDMAN, a citizen of the United States, residing at Philadelphia, in the county of Philadelphia and State of Pennsylvania, have invented certain new and useful Improvements in Sealing Liquids for Compressed-Air Containers and Methods of Making the Same, of which the following is a specification.

My invention relates to a composition of matter for use in sealing pneumatic tires or other compressed air containers against leakage and the object of the invention is to provide a simple and inexpensive composition which will effectively seal such containers against leakage due to small punctures or minute openings due to other causes.

This object I attain in the following manner.

I take from 8 to 10 parts of glue, 3 to 4 parts of saw dust, 3 to 4 parts of sodium carbonate, 3 to 4 parts of rubber or leather shavings, or both rubber and leather, and from 3½ to 4½ parts of resin. These ingredients are thoroughly mixed, the glue and resin being pulverized, and are then cooked in water. I find it advisable to use approximately 5 pints of water to from 20 to 25 parts of the other ingredients and to cook until the total compound is reduced to about two quarts. This produces a liquid of the proper fluidity and viscosity and which is highly effective in sealing small punctures or other small apertures in a pneumatic tire or other compressed air containers.

Having thus described my invention, what I claim as new and desire to secure by Letters Patent is:—

1. The herein described method of making a sealing liquid for compressed air containers consisting in mixing glue, saw dust, sodium carbonate, rubber shavings and resin, and cooking 20 to 26 parts of the mixture in about 5 pints of water until the total compound is reduced to about 2 quarts.

2. The herein described method of making a sealing liquid for compressed air containers consisting in mixing glue, saw dust, sodium carbonate, rubber shavings and resin in about the proportions specified, and cooking 20 to 26 parts of the mixture in about 5 pints of water until the total compound is reduced to about 2 quarts.

In testimony whereof I have signed my name to this specification.

SAMUEL FREEDMAN.